United States Patent
Krautwurm

(10) Patent No.: US 11,556,118 B2
(45) Date of Patent: Jan. 17, 2023

(54) METHOD FOR TESTING AN AUTONOMOUS SYSTEM

(71) Applicant: Siemens Aktiengesellschaft, Munich (DE)

(72) Inventor: Florian Krautwurm, Munich (DE)

(73) Assignee: SIEMENS AKTIENGESELLSCHAFT

(*) Notice: Subject to any disclaimer, the term of this patent is extended or adjusted under 35 U.S.C. 154(b) by 859 days.

(21) Appl. No.: 16/327,225

(22) PCT Filed: Jul. 4, 2017

(86) PCT No.: PCT/EP2017/066559
§ 371 (c)(1),
(2) Date: Feb. 21, 2019

(87) PCT Pub. No.: WO2018/036698
PCT Pub. Date: Mar. 1, 2018

(65) Prior Publication Data
US 2019/0196457 A1   Jun. 27, 2019

(30) Foreign Application Priority Data
Aug. 24, 2016 (EP) .................................... 16185489

(51) Int. Cl.
*G05B 19/418* (2006.01)
*B25J 9/16* (2006.01)
*G06T 17/00* (2006.01)

(52) U.S. Cl.
CPC ...... *G05B 19/41885* (2013.01); *B25J 9/1676* (2013.01); *G05B 2219/25071* (2013.01);
(Continued)

(58) Field of Classification Search
CPC .... G05B 19/41885; G05B 2219/25071; G05B 2219/40202; B25J 9/1676; G05D 2201/0216; G06T 17/00
(Continued)

(56) References Cited

U.S. PATENT DOCUMENTS

2006/0155402 A1   7/2006   Read
2011/0054689 A1*  3/2011   Nielsen ................ G05D 1/0088
                                                    700/258

(Continued)

FOREIGN PATENT DOCUMENTS

AU   2002343044 A1   6/2003
CN      101512453 A   8/2009

(Continued)

OTHER PUBLICATIONS

Zeng et al. (Non-Patented Literature, "Mobile Robot Collision Avoidance in Human Environments") (Year: 2012).*

(Continued)

*Primary Examiner* — John E Johansen
(74) *Attorney, Agent, or Firm* — Schmeiser, Olsen & Watts LLP

(57) ABSTRACT

Provided is a method for testing an autonomous system of which a virtual image exists, the virtual image including at least one virtual image of an autonomous component including the following steps:
a) Acquiring of component data providing information in relation to a movement of the at least one virtual image of the autonomous component;
b) Creating, in the virtual image, at least one virtual object;
c) Generating, in the virtual image, a corpus around the at least one virtual object or/and the virtual image of the at least one component;
d) Representing, in the virtual image, a movement of the at least one virtual object or/and the virtual image of the at least one autonomous component;

(Continued)

e) Acquiring reaction data in relation to the movement of the at least one virtual object or/and the virtual image;

f) Evaluating a feasible course of movement considering the reaction data.

18 Claims, 2 Drawing Sheets

(52) U.S. Cl.
CPC .............. *G05B 2219/40202* (2013.01); *G05D 2201/0216* (2013.01); *G06T 17/00* (2013.01)

(58) Field of Classification Search
USPC ........................................................... 703/6
See application file for complete search history.

(56) References Cited

U.S. PATENT DOCUMENTS

| | | | |
|---|---|---|---|
| 2011/0066282 A1* | 3/2011 | Bosscher | B25J 9/1676 700/248 |
| 2011/0131017 A1 | 6/2011 | Cheng et al. | |
| 2014/0336785 A1 | 11/2014 | Asenjo et al. | |
| 2015/0088310 A1* | 3/2015 | Pinter | G06Q 50/22 700/253 |
| 2015/0095788 A1 | 4/2015 | Thiele et al. | |
| 2015/0294496 A1* | 10/2015 | Medasani | H04N 7/181 348/159 |
| 2016/0041535 A1 | 2/2016 | Leonardi et al. | |
| 2016/0207199 A1* | 7/2016 | Kuffner, Jr. | B25J 19/06 |
| 2016/0216708 A1 | 7/2016 | Krivoshein et al. | |
| 2017/0087722 A1* | 3/2017 | Aberg | B25J 9/1676 |
| 2019/0105779 A1* | 4/2019 | Einav | B25J 9/1697 |

FOREIGN PATENT DOCUMENTS

| | | |
|---|---|---|
| CN | 102081358 | 6/2011 |
| CN | 104142629 A | 11/2014 |
| CN | 104932421 A | 9/2015 |
| CN | 105137973 A | 12/2015 |
| CN | 105511430 A | 4/2016 |
| CN | 105593773 A | 5/2016 |
| DE | 102012208252 A1 | 7/2013 |
| RO | 129121 | 12/2013 |
| WO | 03046672 A2 | 6/2003 |
| WO | 2016082847 A1 | 6/2016 |

OTHER PUBLICATIONS

Balan et al. (Non-Patented Literature, "Real-time 3D Collision Avoidance Method for Safe Human and Robot Coexistence") (Year: 2006).*

De Santis, Agostino, and Bruno Siciliano. "Safety issues for human-robot cooperation in manufacturing systems." Tools and perspectives in virtual manufacturing (2008). pp. 1-12. (Year: 2008).*

Chedmail, Patrick, Damien Chablat, and Christophe Le Roy. "A distributed approach for access and visibility task with a manikin and a robot in a virtual reality environment." IEEE Transactions on Industrial Electronics 50.4 (2003). pp. 692-698. (Year: 2003).*

PCT International Search Report dated Sep. 27, 2017 and corresponding to PCT International Application No. PCT/EP2017/066559 filed on Jul. 4, 2017.

European Search Report for EP Application No. 16185489.8, dated Mar. 1, 2017.

Zhiqiang, Zhang et al: "Development and application of integrated managment system of smart factory"; Development and application of intelligent factor integrated managment Information system; Chemical Industry and Engineering Progress; vol. 35, No. 4; Apr. 30, 2016; pp. 1000-1006.

Khan, Muhammad Umer et al: "CPS Oriented Control Design for Networked Surveillance Robots With Multiple Physical Contraints"; IEEE Transactions on Computer-Aided Design of Integrated Circuits and Systems, vol. 35, No. 5; May 31, 2016; pp. 778-791.

Xueqin, Niu: "Smart Factory and the Transformation and Upgrading of Equipment Manufacturing Industry"; We will transform and upgrade smart factories and equipment manufacturing; Process Automation Instrumentation, Mar. 31, 2014; vol. 35; No. 3; Mar. 2014; pp. 1-6.

Chinese Office Action for Application No. 201780065781.4, dated Jul. 23, 2021.

* cited by examiner

METHOD FOR TESTING AN AUTONOMOUS SYSTEM

CROSS-REFERENCE TO RELATED APPLICATIONS

This application claims priority to PCT Application No. PCT/EP2017/066559, having a filing date of Jul. 4, 2017, which is based on European Application No. 16185489.8, having a filing date of Aug. 24, 2016, the entire contents both of which are hereby incorporated by reference.

FIELD OF TECHNOLOGY

The following relates to a method for testing an autonomous system and an autonomous system.

BACKGROUND

The process of setting up an automated system, e.g. a production system, can be divided in a planning phase for designing the system, an engineering phase for realizing the system, a commissioning phase for installing and testing the system, a production phase where the system goes live, and a maintenance and optimization phase running in parallel to the production phase, where the system is supervised, optimized and occurring faults are fixed.

In industrial manufacturing there is a tendency from traditional, centralized systems to autonomous, distributed systems. Autonomous distributed systems comprise components, e.g. robots, which are not controlled by a central instance and have a certain degree of autonomy for their actions.

Moreover, traditional equipment is used in combination with new technologies such as intelligent robots, CNC machines, 3D printers and other smart devices, which have an interface to a virtual simulation or/and emulation environment. Hence, interaction between the real world and a virtual image thereof can be provided. A term used therefore for these manufacturing systems is Cyber-physical production system.

This virtual, digital copy on the IT platform, where it is running is often referred to as "digital factory".

For planning, testing and operating of these systems a concept can be used where for the real or physical factory there is a virtual, digital copy reflecting certain aspects of a certain component or group of components. This virtual digital copy is sometimes referred to as digital twin.

The underlying idea is to explore or control the behavior of some or all components of the physical factory without having to actually run the procedure on the physical components.

In these autonomous, distributed systems often there is cooperation between the autonomous components, e.g. robots, and human co-workers. However, this bears the danger that not only collision between the autonomous components might occur but also that human co-workers are injured by the autonomous components.

An aspect relates to offer a possibility for an effective testing of an autonomous system, in particular in regard to safety aspects.

SUMMARY

An aspect relates to a method for testing an autonomous system of which a virtual image exists. The virtual image comprises at least one virtual image of an autonomous component.

For example, the virtual image is set up as a duplicate of the autonomous system running on a computer that provides the processing power. Input to that duplicate may comprise e.g. the architecture, hardware or data stemming e.g. from sensors of the real factory. Duplicate is not to be understood that there is an exact copy showing every single detail of the autonomous system. Certain aspects of an autonomous system are emulated in the virtual image with the help of the processing power of the computer the virtual image is running.

In a step, component data providing information in relation to a movement of the at least one virtual image of an autonomous component are acquired, e.g. simulation data or data from the real autonomous system or combinations thereof are fed into the virtual image.

In the virtual image at least one virtual object that can move within the virtual image (VE) is created, e.g. a virtual human operator.

In the virtual image a corpus is generated around the at least one virtual object or/and the virtual image of the at least one component. The corpus defines a volume that cannot be entered neither by the virtual image of the at least one autonomous component nor the virtual object. E.g. the corpus generates a buffer zone around a virtual element that can then be used for calculations.

In the virtual image a movement of the at least one virtual object or/and the virtual image of the at least one autonomous component is represented. The movement is restricted in that the volume of any corpus cannot be entered.

E.g. with this buffer zone a collision would occur before an actual collision—considering the actual, virtual boundaries of the elements—in the virtual image takes place.

Reaction data in relation to the movement of the at least one virtual object or/and the virtual image of the at least one autonomous component are acquired.

E.g. data are gathered for which paths taken by the virtual object a collision is prone to be happen.

A feasible course of movement of the at least one virtual object or/and the virtual image of the at least one autonomous component is evaluated. Thereby reaction data are considered. E.g. the reaction data are processed to determine possible course of movements such as paths taken at a certain time or/and movement for production tasks etc.

That corpus is of the shape of a box or paralepiped. This reduces computational efforts.

According to an advantageous embodiment the corpus around the virtual object or/and at least one autonomous component is variable in dependence on the direction and size of the velocity of the object or/and the autonomous component. In the example of a corpus of the form of a box, the box' edges are prolonged in the direction of the movement. The actual length that it is prolonged depends on the size of the velocity, preferably to its square. In addition, or alternatively the actual length depends also on the transmission time and the processing time. Thus, it can be taken care of delay times due to a later transmission into the real autonomous system, processing times of virtual as well as real element and a safety buffer can be installed.

Embodiments of the invention further relates to a corresponding autonomous system, computer program and data carrier.

BRIEF DESCRIPTION

Some of the embodiments will be described in detail, with reference to the following figures, wherein like designations denote like members, wherein.

DETAILED DESCRIPTION

Figure 1:
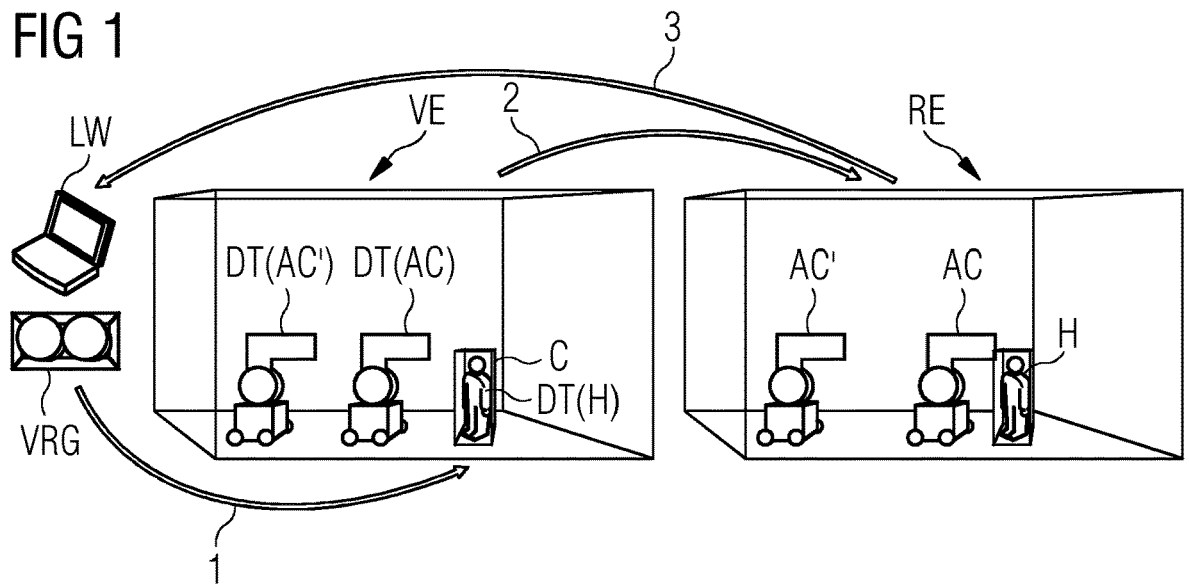
FIG. 1 depicts a schematic view of a data transfer into a virtual environment and from a virtual environment to a real environment.

In the following description, various aspects of embodiments of the present invention and embodiments thereof will be described. However, it will be understood by those skilled in the art that embodiments may be practiced with only some or all aspects thereof. For purposes of explanation, specific details and configurations are set forth in order to provide a thorough understanding. However, it will also be apparent to those skilled in the art that the embodiments may be practiced without these specific details.

A testing of an autonomous system is often performed
a) before a system enters the production phase and
b) when the production has already started, for purposes of maintenance or e.g. if new software-updates are used, new component are introduced etc.

For a testing before the system has entered the production phase no data from the real system are available. Hence artificial data generated by simulation or taken from similar environments are used in the virtual environment VE for simulating procedures in the system, e.g. production tasks in a production system.

This virtual environment VE reproduces artificially a real environment RE that not yet exists or an already existing real environment RE or some aspects thereof. Often elements in the virtual environment VE which represent existing or planned elements in the real environment are referred to as digital twins.

For a testing of an already running system e.g. when a new software update has been installed, actual data from the real system or the real environment can be taken.

Also, a mix of data, actual data and artificial data, may be used as input data, e.g. in a situation when new components are introduced into the system or any error and/or faults are injected into the system for testing purpose.

With these input or component data a behavior of the system can be simulated in the virtual environment VE.

Further, a virtual object DT(H), e.g. a human or a delicate robot, is introduced into the virtual environment VE, which is moving in between digital representations of the autonomous components AC, AC'. Hence there is the danger that the virtual object DT(H) would be affected in a real environment, e.g. injured or destroyed, by the autonomous components if a collision occurs.

Around the virtual object DT(H) a corpus C is generated. According to the embodiment the corpus C has the simple form of a box. Alternatively, the corpus is formed by a composite of a variety of volumes, e.g. reconstructing torso and extremities.

The virtual object DT(H) is moving within the virtual environment VE. The box C around the object H enlarges the object artificially and thus provides a buffer zone or safeguard against collisions with the digital twins DT(AC), DT(AC') or other installations of the system represented in the virtual image of the system. Thus, by having this artificially enlarged volume it can be tested and ensured that collisions with human co-workers will be recognized by the applied collision detection procedures or/and algorithms. Further, it can be tested and installed what appropriate actions have to be triggered at what time.

Thus, a feasible course of movement can be explored. Examples for a course of movement are a way in between the digital twins DT(AC), DT(AC') which is possible and safe for the object H, or a movement of the object H when collaborating with the digital twin DT(AC), DT (AC') of an autonomous object AC, AC'.

By automating a path that a virtual object makes through the virtual image of a plant, already at this early stage automated testing of safety features can be started.

The movement data of the object H are fed or mapped into the virtual environment VE, as indicated by the arrow 1 in FIG. 1. The movement data may be created by a person wearing virtual reality glasses VRG when being immersed in the virtual environment VE. Thus, just by virtually walking around, explorative testing of the virtual commissioning can be performed.

Alternatively, or additionally movement data may be generated via a computer simulation e.g. on a local workspace LW, eventually also using real data from the real environment RE as indicated by arrow 3.

In this way a testing of an e.g. production plant can be done, before the real production plant yet exists, which facilitates the planning, e.g. arrangement and radiuses of movement of autonomous objects in order not to endanger an object, in particular a human.

By the additional volume's safety measures can be implemented that account for inaccuracies of path or velocity determination as well as delay times occurring due to transfer between virtual and real environment or/and processing times etc.

Thus during a virtual commissioning phase, a behavior of a physical production environment is simulated or replicated with the help of a software system. Thus, many tests normally performed in a commissioning phase where the installation of the physical production environment has taken place and it needs to be verified whether specifications can be met, can thus be performed before investments and work has been done.

In this virtual commissioning phase, a human can be introduced as virtual object H and move through the virtual image of the future production environment and courses of movement can be explored, as explained above. In particular to approach the possible limits, the corpus, in particular the box, around the human can be disabled, so that the human can come as close to the virtual image of an element of the production plant as possible by their physical dimensions.

In sum, safety features can be tested in very early stages and also in an automated way, which saves cost and time.

Alternatively, or additionally a testing is performed while a real system is already running. Then data for the simulation of the virtual environment can be taken also from the real environment or/and these data can be taken as a starting point for generating data.

As the feedback of the virtual images of real elements in the real production plant is fed back or mirrored to the real environment as indicated by arrow 2, this can be used for testing, in particular regression testing where differences to prior procedures are to be detected and explained. Hence, in the commissioning phase reactions in the real factory or production plant can be observed, when the position of the human as virtual object H is being mapped from its virtual position into the real factory. Thus, regression testing in the real commissioned environment can be performed.

In addition, if the human as virtual object H visits several positions of the virtual image, a virtual inspection of the running system is performed, if the respective data from the real world are fed into the virtual image.

The corpus C may be of variable shape. According to one embodiment the variability is in that the corpus can be shrinked to no volume, i.e. switched off. This means, that a collision occurs if the boundaries of the object H itself hit the boundaries of a digital twin DT(AC), DT(AC') itself or the boundary of a corpus C around the digital twin DT(AC), DT(AC'). Thus, e.g. the limits of possible paths can be explored. Further embodiments where the corpus C is variable will be explained in relation with FIG. 3.

Figure 2:
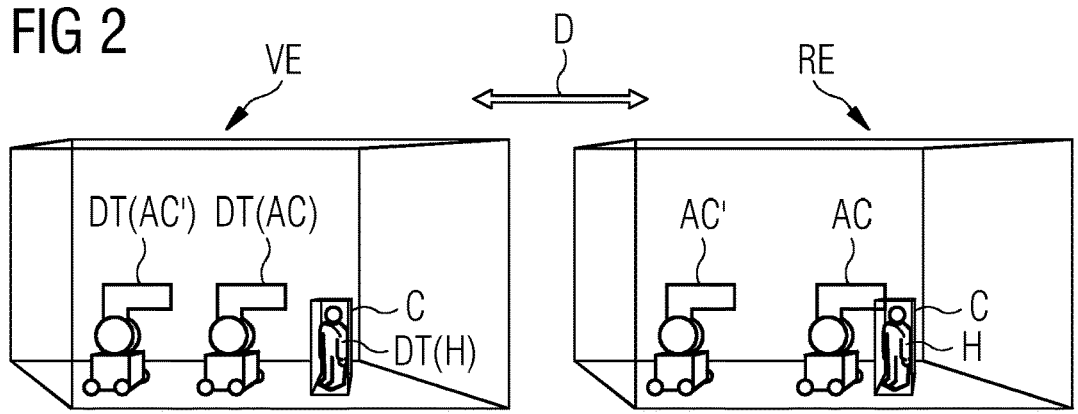
FIG. 2 depicts a schematic graph of a real environment with autonomous components and a human coworker and a virtual environment representing a copy of the real environment exchanging data.

FIG. 2 depicts a real environment RE of a section of a production plant which is exchanging data D with a virtual environment VE reflecting the real environment or certain aspects thereof and is used for detailing the realization of the virtual image VE.

In the real environment RE there are autonomous components AC, AC' that interact with each other in order to realize a task, e.g. a production process. The autonomous components AC, AC' are e.g. robots that are adapted to perform a certain set of production tasks within a production process. The autonomous components AC, AC' are not centrally controlled but have a defined range of autonomy to make decisions.

The range of autonomy may depend on the specific production task, the actual constellation of the autonomous components AC, AC', etc.

Within the production plant there is further an object H, e.g. a human which interacts with the autonomous components AC, AC'.

The interaction may be that the human H performs production tasks together with one or more autonomous components AC, AC' or that the human H is moving within the production plant.

The virtual environment VE is a virtual image of a real environment RE. The virtual image is running on an IT platform. This means that a real environment RE is emulated with the help of a real computer such that a share of the real environment RE is reproduced virtually on that computer. This enables monitoring, supervision or testing of the real environment RE, e.g. an autonomous system without interfering, i.e. intervention into running operation.

The share of the autonomous system being reproduced depends on the objective of the virtualization. E.g. only a certain aspect or part may be virtualized for its optimization or testing.

Correspondingly, each element or only some of the elements of the real environment RE has a corresponding element in the virtual environment VE.

An element such as an autonomous component, e.g. a robot, has a plurality of sensors which produce sensor data.

A sensor may comprise a position detection sensor, a movement detection sensor, an acceleration sensor, a force sensor, a camera, an audio sensor, a smell sensor etc, a sensor detecting the presence of certain substances etc. Correspondingly, the sensor data may comprise position, e.g. spatial position, related data, velocity/acceleration or/and direction of movement/acceleration related data, data in relation to size and direction of a force, visual data, audio data, scent data, data in relation to existence and amount of certain substances etc.

Alternatively, to the case where each element in the real environment RE has a corresponding element in the virtual environment VE, only certain elements of the real environment RE have a corresponding object in the virtual environment VE. This allows modeling, testing or surveillance of certain aspects of a production plant. This goal can also be achieved with an embodiment, where all the elements of the real environment RE may have a corresponding element in the virtual environment, but only data regarding some elements are transferred from the real environment RE to the virtual environment VE or used for further computation in the virtual environment VE.

In the virtual environment VE the actual behavior of the elements in the real environment RE can be modeled with the help of the virtual or computerized representations of the real elements. As mentioned above, the virtual representations are sometimes referred to as digital twin.

With the help of these digital twins the production plant in the real environment RE can be modeled. The sensors of the real objects provide data which are transferred into the virtual environment VE. There, with the help of a 3 D modeling software the digital twin is usually made identical to the real object e.g. in shape but in relation to actual state, e.g. position of a robot and position of its gripping arm, motion of the various constituents of the robot etc.

Therewith the future behavior of the autonomous components AC, AC' can be simulated and future situations, e.g. collisions can be determined. These simulation data are transferred back to the autonomous components AC, AC'. They may use as information which for decision making.

For the transfer of data D between the real environment RE and the virtual environment VE various transfer modes can be used, such as wire-bound or wireless transfer methods or any combination thereof.

According to an advantageous embodiment there is a wireless connection, such as one according to an 802.11 standard from the autonomous components AC, AC' to a central transmitting entity in the real environment. From that central transmitting entity there is a wire-bound connection, e.g. an Ethernet connection.

Alternatively, or additionally the data are transferred across wired connections to stationary autonomous components, such as conveyor belts or fixed robots.

Figure 3:
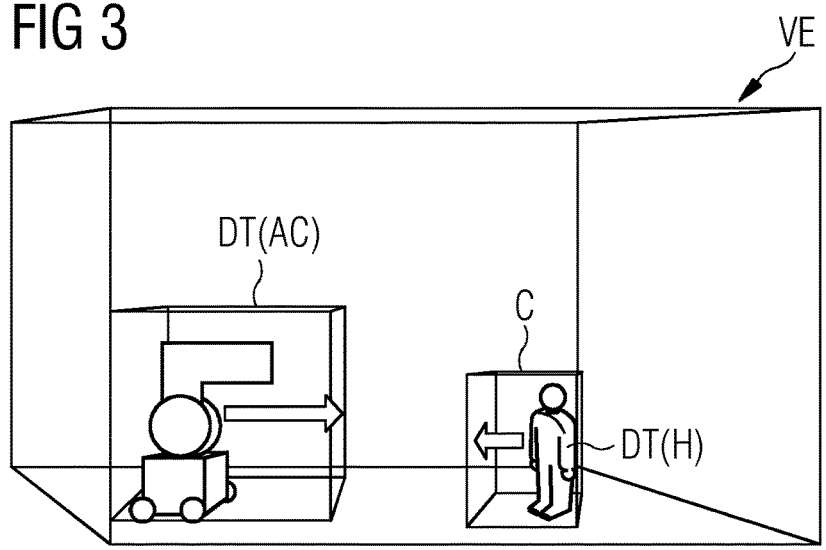
FIG. 3 depicts a schematic graph of a virtual image of a human operator surrounded by a box extended in the direction of movement, moving towards an autonomous component in the virtual environment with the digital image of the production system.

In FIG. 3 an embodiment is depicted where the corpus C having the form of a box having edges parallel to the direction of movement and perpendicular thereto, i.e. a cuboid.

The box is enlarged in the direction of movement. This enlarging is done in relation to the velocity, i.e. for a higher velocity the edge parallel to the direction of movement becomes longer than for a lower velocity.

According to an advantageous embodiment the length of the edge is calculated in this way:

First, there is a basic box determined that offers sufficient space in all directions around the human in order to remain unharmed. Then, there is an additional edge length added in the direction of movement. This additional edge length is calculated such that the distance presumably covered during the travel time of the signal from the human or endangered object to the virtual entity and back plus the respective processing times is still inside the box. This estimate is done based on previous measurement values of velocity/direction and processing times. Also inaccuracies of position, velocity or/and time taking measurements etc. are taken into account.

In addition, in FIG. 3, also the autonomous component AC is equipped with a box as surrounding corpus C. By using surrounding corpuses not only for the object at risk, in particular the human, the interconnection of the individual movements of the autonomous components and objects at risk can be considered more easily. Advantageously the edge length of both safety boxes is extended in the direction of movement. By equipping not only the virtual object DT(H) with a corpus C it is computationally advantageous to consider the movement and velocities of the virtual image of the autonomous component DT(AC), especially because of the distribution of control.

Figure 4:
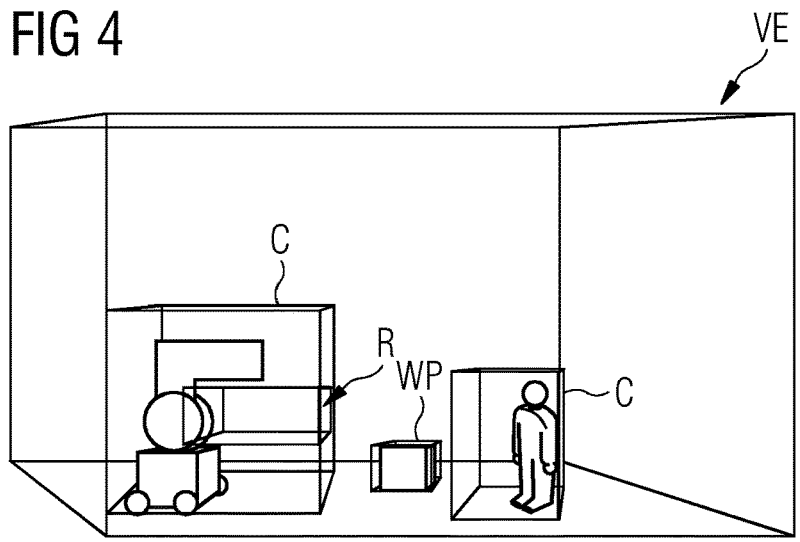
FIG. 4 depicts a schematic graph of a corpus around the virtual image of an autonomous object, said corpus having a recess to allow interaction, e.g. work piece handling, with a human coworker.

In FIG. 4 an embodiment is depicted wherein in the corpus C around the virtual image of an autonomous component DT(AC), DT(AC') a recess R is formed. The volume within that recess is excluded from the volume of the corpus that cannot be entered. Additional rules may be applied for the volume of the recess R, e.g. that the recess volume may be entered generally or be entered by certain objects, e.g. only by humans.

According to a further embodiment a corpus C is defined differently for different (digital twins of) objects. E.g. there is a corpus type for human actors, a further corpus type for cyber physical components, a corpus type for work pieces or a corpus type for safety zones. Having made this distinction, a finer set of rules can be defined, in order to allow interactions in the course of the production process but still ensure the safety of humans and components.

According to an exemplary set of rules no collisions may be allowed between humans and cyber physical components, in between work pieces, between cyber physical components and safety zones, in between cyber physical components.

"Collisions" or rather interactions may be allowed between humans or cyber physical components and work pieces.

Thus, interaction or/and contact necessary in the production process is possible in small, defined corridors. Thereby still dangerous collisions can be avoided.

Figure 5:
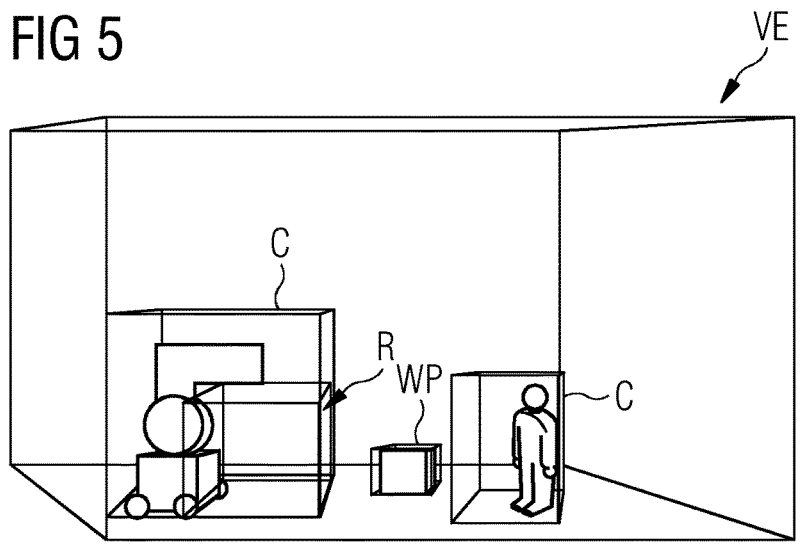
FIG. 5 depicts a schematic graph as that of FIG. 4, where the recess is enlarged to facilitate interaction.

According to FIG. 5 the recess is enlarged to facilitate the handling of a work piece WP, in particular when a set of rules for intrusion as above is used. Thus, e.g. a large corridor may be defined to enable an easy handling whilst still ensuring that no dangerous collision happens.

Figure 6:
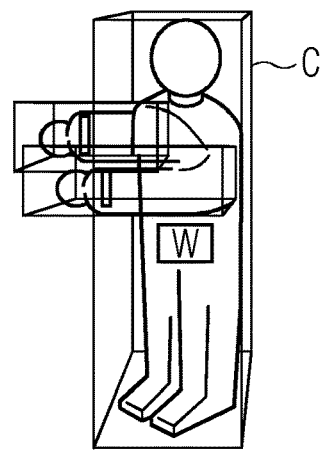
FIG. 6 depicts a schematic graph showing a corpus suited for a human worker formed by a composition of boxes surrounding the torso and the extremities.

In FIG. 6 a human is depicted which is wearing a detector for position determination. Based on these detector data in the virtual environment a corpus C attached to the human can be generated. In the depicted example the corpus C is formed by a plurality of boxes surrounding the body and the arms. The number of boxes used for forming the corpus C is depending on the working environment and the duties of the human coworker.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for testing a physical autonomous system of which a virtual image exists, wherein the virtual image is a digital twin of the physical autonomous system, the virtual image comprising at least one virtual image of an autonomous component, the method comprising the following steps:
   a) acquiring of component data providing information in relation to a movement of the at least one virtual image of the autonomous component;
   b) creating, in the virtual image, at least one virtual object that can move within the virtual image, wherein the at least one virtual object is a human worker in the autonomous system;
   c) generating, in the virtual image, a corpus around the at least one virtual object and the virtual image of the at least one autonomous component, the corpus defining a volume that cannot be entered around either the virtual image of the at least one autonomous component or the at least one virtual object;
   d) representing, in the virtual image, a movement of the at least one virtual object or/and the virtual image of the at least one autonomous component, the movement being restricted in that the volume of any corpus cannot be entered;
   e) acquiring reaction data in relation to the movement of the at least one virtual object or/and the virtual image of the at least one autonomous component;
   f) evaluating a course of movement of the at least one virtual objector/and the virtual image of the at least one autonomous component considering the reaction data.

2. The method according to claim 1, wherein one criterion for evaluating a feasible course of movement is to avoid a collision between the at least one virtual object and the virtual image of the at least one component.

3. The method according to claim 1, wherein data in relation to the evaluated feasible course of movement are transferred from the virtual image of the autonomous system to the autonomous system.

4. The method according to claim 1, wherein in step a) the component data are formed by:
   sensor data from a sensor on or at the autonomous component;
   sensor data from a sensor on or at the premises of the autonomous system;
   data in relation to a movement of the autonomous component;
   simulation data simulating the behavior of an autonomous component; and/or
   virtual reality data generated by movements within the virtual image.

5. The method according to claim 1, wherein at least one of the corpuses created around the at least one virtual object or/and the virtual image of the at least one autonomous component has the shape of a box.

6. The method according to claim 1 wherein the corpus around the at least one virtual object or/and at least one component is variable in dependence on the size of velocity or/and direction of velocity or/and the existence of further virtual images of autonomous components.

7. The method according to claim 6, wherein for the existence of further virtual images of autonomous components a number within a predefined section of the virtual image of the autonomous system or/and a type of the virtual image of the autonomous components is considered.

8. The method according to claim 6, wherein a hazardous potential is determined dependent on
a size or/and of the real autonomous components;
a range of possible movements;
a velocity range;
a direction or/and size of acceleration; and/or
a weight of a moving part, wherein the moving part is a robot arm, of the autonomous component.

9. The method according to claim 6, wherein the corpus is variable in that it can be switched off.

10. The method according to claim 1 wherein in step e) the acquiring of reaction data takes place in the virtual image of the autonomous system or the real autonomous system.

11. The method according to claim 1 wherein the testing is performed before the real autonomous system as it is represented in the virtual image is in operation and the component data are simulated or/and taken from already existing parts of the autonomous system.

12. The method according to claim 1 wherein the testing is performed when the real autonomous system is in operation and wherein for the testing a comparison is performed between a procedure at a first point in time and the same procedure at a later point in time.

13. The method according to claim 1, wherein the corpus is formed such that it comprises at least one recess the volume within such recess being excluded from the volume of the corpus that is not allowed to be entered.

14. The method according to claim 13, wherein for the excluded volume rules for access are installed depending on the object that the excluded volume is allowed to be entered or/and allowed to be entered only by the object or/and the work piece.

15. An autonomous System, comprising a processor and at least one autonomous component, for at least parts of which a virtual image exists, wherein the processor is configured to perform a method comprising:
acquiring component data providing information in relation to a movement of at least one virtual image of the at least one autonomous component;
creating, in the virtual image, at least one virtual object that can move within the virtual image, wherein the at least one virtual object is a human worker;
generating, in the virtual image, a corpus around the at least one virtual object and the virtual image of the at least one autonomous component, the corpus defining a volume that cannot be entered around either the virtual image of the at least one autonomous component or the at least one virtual object;
representing, in the virtual image, a movement of the at least one virtual object or/and the virtual image of the at least one autonomous component, the movement being restricted in that the volume of any corpus cannot be entered;
acquiring reaction data in relation to the movement of the at least one virtual object or/and the virtual image of the at least one autonomous component; and
evaluating a course of movement of the at least one virtual objector/and the virtual image of the at least one autonomous component considering the reaction data.

16. A computer program product, comprising a non-transitory computer readable hardware storage device storing a computer readable program code, the computer readable program code comprising an algorithm that when executed by a computer processor of a computing system implements a method comprising:
providing a virtual image of a physical autonomous system, wherein the virtual image is a digital twin of the physical autonomous system,
acquiring component data providing information in relation to a movement of at least one virtual image of an autonomous component of the physical autonomous system;
creating, in the virtual image, at least one virtual object that can move within the virtual image, wherein the at least one virtual object is a human worker in the autonomous system;
generating, in the virtual image, a corpus around the at least one virtual object and the virtual image of the at least one autonomous component, the corpus defining a volume that cannot be entered around either the virtual image of the at least one autonomous component or the at least one virtual object;
representing, in the virtual image, a movement of the at least one virtual object or/and the virtual image of the at least one autonomous component, the movement being restricted in that the volume of any corpus cannot be entered;
acquiring reaction data in relation to the movement of the at least one virtual object or/and the virtual image of the at least one autonomous component; and
evaluating a course of movement of the at least one virtual objector/and the virtual image of the at least one autonomous component considering the reaction data.

17. The method according to claim 1, wherein in step a) the component data are formed by data created by use of virtual reality glasses when moving through the virtual image of the autonomous system.

18. The method according to claim 1 wherein the corpus has the shape of a box which edges are prolonged in direction of the movement or/and in relation to the size of velocity.

* * * * *